US006267036B1

(12) United States Patent
Lani

(10) Patent No.: US 6,267,036 B1
(45) Date of Patent: *Jul. 31, 2001

(54) FRUIT AND VEGETABLE DECORATIVE CARVING DEVICE

(76) Inventor: Michael A. Lani, 4211 S. Fox St., Englewood, CO (US) 80110

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/088,168

(22) Filed: Jun. 1, 1998

(51) Int. Cl.$^7$ .................................................. B26F 1/00
(52) U.S. Cl. .............................. 83/660; 30/315; 30/358
(58) Field of Search ............................ 30/358, 366, 314, 30/315, 113.1; 83/542, 30, 660

(56) References Cited

U.S. PATENT DOCUMENTS

| 326,160 | * | 9/1885 | Seaver et al. ......................... 83/660 |
| 579,979 | * | 4/1897 | Housh .................................... 83/660 |
| 2,068,037 | | 1/1937 | Osborn . |
| 2,495,553 | * | 1/1950 | Shaw ...................................... 30/358 |
| 3,965,574 | | 6/1976 | Graves . |
| 4,010,543 | * | 3/1977 | Nusbaum ............................. 30/113.1 |
| 4,057,898 | | 11/1977 | Piosky . |
| 4,296,659 | | 10/1981 | Nauman . |
| 4,327,489 | * | 5/1982 | Conrad .................................. 30/315 |
| 4,365,415 | | 12/1982 | Pustoch . |
| 4,818,207 | * | 4/1989 | Heron .................................... 30/315 |
| 4,828,114 | | 5/1989 | Bardeen . |
| 5,091,833 | | 2/1992 | Paniaguas et al. . |
| 5,099,579 | | 3/1992 | Chadwick . |
| 5,579,582 | * | 12/1996 | Carlson ................................. 30/315 |
| 6,055,738 | * | 5/2000 | Bardeen et al. ....................... 33/566 |

* cited by examiner

Primary Examiner—Kenneth E. Peterson
Assistant Examiner—Stephen Choi
(74) Attorney, Agent, or Firm—Lee G. Meyer; Snell & Wilmer LLP

(57) ABSTRACT

A device, which can be incorporated into a kit, useful in carving decorative designs in the shell or skin of fruits or vegetables having a base plate, which is preferably flexible, containing a plurality of co-planar, upstanding, piercing elements, in a decorative pattern relative to the base plate, whose axis are formed in a plane substantially perpendicular to the plane of the base plate. The drive pins forming an elongated shaft, having one end secured to the base plate and the other forming a piercing point. The carving kit includes the device having driving pins configured in a pattern, at least one cutting tool for inserting into the perforations made by the device; and instructions for use of the device in conjunction with the cutting tools. Preferably the device is used to facilitate carving of pumpkins at Halloween.

2 Claims, 2 Drawing Sheets

FRUIT AND VEGETABLE DECORATIVE CARVING DEVICE

BACKGROUND OF THE INVENTION

1. Field of the Invention

The invention relates generally to fruit and vegetable decorative carving devices; and more particularly to a devices and kits for carving, sculpting and decorating fruits and vegetables by carving decorative patterns in the fleshy shell or skin.

2. Related Art

Carving or sculpting fruits and vegetables having a fleshy outer skin or rind has long been known. Cucumbers, apples, cantaloupe, watermelons, gourds, to name a few, are turned into ornamental center pieces by use of carving artistry. The finer dining establishments employ such techniques to enhance the "presentation" of their cuisine.

Likewise, pumpkin carving has long been one of the several ways in which Halloween is celebrated. Traditionally, pumpkin carving involves the removal of a portion of the pumpkin shell surrounding the stem, removal of the seeds and fibers contained in the pumpkin and carving humourous, grotesque or other decorative features in the pumpkin shell by sculpting and then removing fleshy portions of the shell to obtain the desired appearance. Internal illumination can be provided, either by a candle or by a battery operated light to enhance the effect. This illumination results in a glowing decorative pattern.

In the past, pumpkin carving was typically accomplished through the use of pocket knives, paring knives and the like. Due to the size of these cutting instruments though, the typical carver was only able to obtain crude decorative features. Since the cutting knives used in pumpkin carving are difficult to control, any attempt at carving detailed or intricate design features "free hand" usually met with disappointment, since the carver often unintentionally removed portions of the pumpkin shell which destroyed the design and thus, the appearance.

The development of carved pumpkin designs has become a burgeoning commercial enterprise. One innovation was the use of small hand-held saws and spiral drill bits to produce intricately and exotically carved pumpkins. Later patterns were printed on tissue, or similar material, and then affixed to the outer skin by means of for example, tacks or nails. The carver then tried to cut along the design on the paper pattern, simultaneously cutting the skin of the pumpkin. This system has obvious draw backs. First, the patterns tend to tear as the knife is inserted. Second, the pumpkin juice soaks the material causing it to deform and tear. Third, it is difficult to gauge the depth of the incision required to penetrate through the meat of the pumpkin to its inner core.

There are many attempts in the prior art to provide appropriate forms, designs and tools for carving and decorating fruits and vegetables. U.S. Pat. No. 4,828,114 shows a pumpkin carving kit, with carving implements that are used with templates to form a design. U.S. Pat. Nos. 4,296,659 and 3,965,574 disclose cutting devices designed to form a jack-o-lantern. U.S. Pat. No. 4,365,415 shows a device for cutting melons.

SUMMARY OF THE INVENTION

The present invention is directed to a device, which can be incorporated into a kit, useful in carving decorative designs in the fleshy shell or skin of fruits and vegetables. The device comprises a backing member or base plate, which is preferably flexible, having a plurality of co-planar, upstanding, drive pins or piercing elements whose axis are formed in a plane substantially perpendicular to the plane of the base plate. The drive pins, formed in a decorative pattern relative to the base plate, extend from one side of the base plate, with each drive pin being secured to the base plate, and including a free end which forms a piercing point.

The drive pins can be cylindrical in shape, conical, flat (such as a blade) or of any configuration to form an elongated, ridged piercing/cutting surface. The drive pins are preferably embedded in the base plate in an up-standing arrangement and configured upon the base plate in an artistic design, such that when a piercing force is applied to the base plate, the piercing points of the drive pins are caused to pierce the shell or skin of the fruit or vegetable in the pattern of the design. The device is then removed to reveal a series of skin penetrations in the form of the design carried by the device. A carving instrument is then used to connect the perforations in the shell or the skin to carve a design in the meat of the fruit or vegetable.

Broadly stated the invention relates to a device and method for carving or sculpting designs and patterns in fruits and/or vegetables for the purpose of artfully decorating the fruits and/or vegetables by first piercing the fleshy shell or skin with a device having a backing element supporting upstanding piercing elements distributed on the backing element in the form of the desired design or pattern; and, then inserting a carving instrument into the fleshy skin or shell of the fruit and/or vegetable along the pierced outline forming a continuous penetration or cut into the flesh of the article to effect a design. In one embodiment, the device employs a flexible backing element of a resilient, plastic type material. In another embodiment solid, conically shaped drive pins, ½" to ¼" inches in length, penetrate through one side of the base plate to protrude from the other side of the base plate to form a design pattern of needle like spines.

In operation, the drive pins are aligned on the object to be decorated, and, by means of pressure applied to the backing, the drive pins pierce the shell or skin and are thus, driven into the fruit or vegetable. The device is then removed to expose the outline of the design and the design is carved into the object by continuously penetrating the flesh along the pattern of the drive pin punctures with a carving instrument or tool.

The kit of the invention includes the device for piercing the skin or shell in a decorative pattern, at least one carving tool suitable for continuously puncturing the flesh of the fruit and/or vegetable to be decorated and an instruction book containing instructions that correlate application of the design features of the device to the object to be decorated and the use of the cutting tools. In the preferred embodiment of the present invention this carving kit is in the form of a self contained binder or box for housing the elements of the kit. Pockets having an interior that may be closed by a closure flap or plastic zipper are retained in the binder or box. Cutting or carving tools, preferably in the form of small saws and knives are received in the pocketed portion with the closure flap operative to retain the cutting tools and the device featuring one or more designs.

Preferably, the small saws and knives are integrally molded plastic pieces having a handle portion and a cutting element extending axially thereof. The saw elements can further be formed by loose saw blades and at least one pair of complementary handle sections which may be secured together to mountably receive the saw blades in an axial position. The instruction book contains instructions for assembling the cutting tools as well as operating the device for piercing the skin or shell in a decorative pattern.

The advantages of this invention both as to its construction and mode of operation, will be readily appreciated as the same becomes better understood by reference to the following accompanying drawings in which like reference numerals designate like parts throughout the figures.

BRIEF DESCRIPTION OF THE DRAWINGS

Other advantages of this invention will be apparent from the following specification, claims, and drawings, in which:

DESCRIPTION OF THE PREFERRED EMBODIMENT

Figure 1:
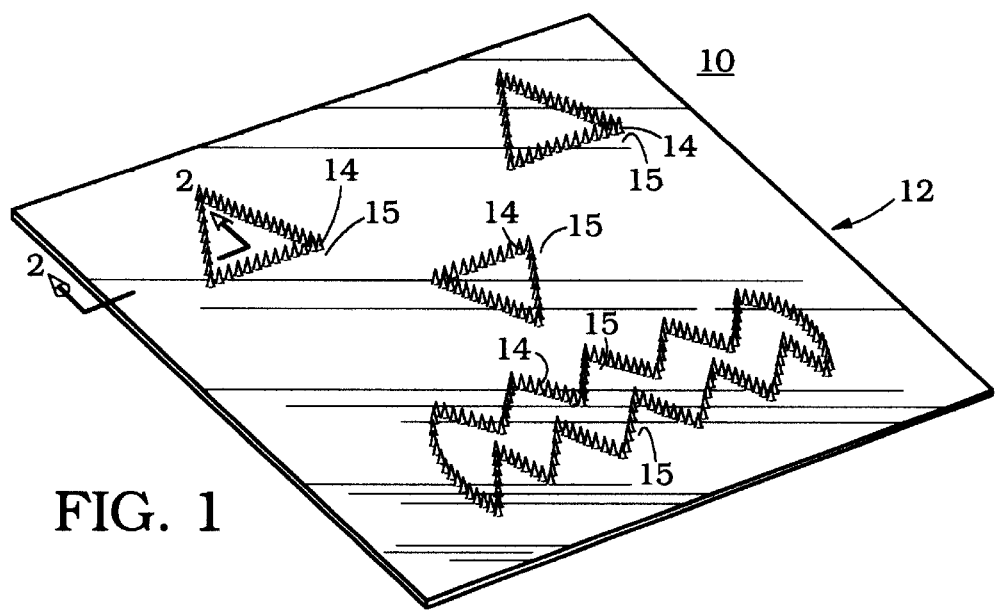
FIG. 1 is a prospective view of a base plate having a plurality of upstanding drive pins fashioned in the face of a Jack-O-Lantern in accordance with the invention.

Referring now to the drawings, there are shown in FIG. 1 fruit and/or vegetable decorative carving device 10 for carving, sculpting and decorating fruits and vegetables in accordance with the instant invention. As shown in FIG. 1, but better seen in FIG. 2, the device includes a base plate 12 of generally rectangular configuration having a plurality of co-planar, upstanding, drive pins or piercing elements 14 whose axis are formed in a plane substantially perpendicular to the plane of the base plate 12 and having one end 15 attached to the base plate 12 and preferably being embedded therein. Each drive pin or piercing element 14 has an elongated shaft portion 16 which terminate at a piercing tip 18.

Figure 2:
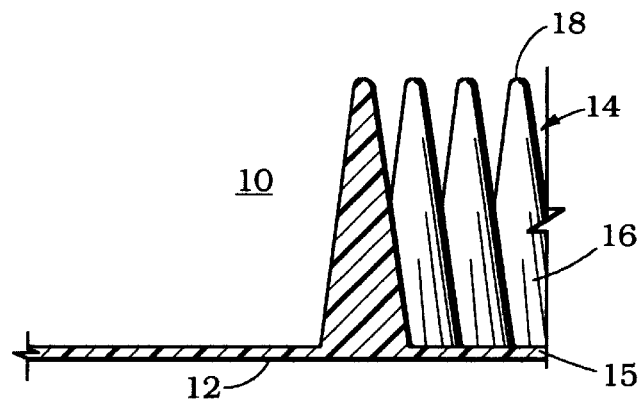
FIG. 2 shows a sectional view of the device in FIG. 1 along the lines 2—2, having solid conically shaped drive pins.
Figure 4:
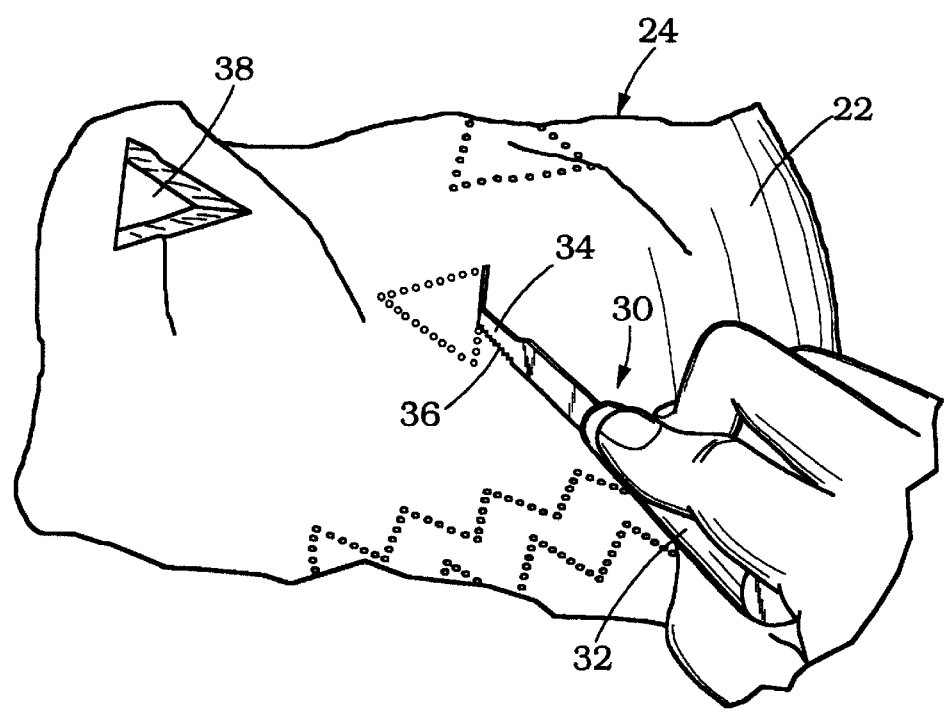
FIG. 4 is an illustrative view of the continuos penetration of the plurality of pierces shown in FIG. 3 by insertion of a small saw blade.

In accordance with one embodiment, as illustrated in FIG. 2, the device 10 has a base plate 12 which supports a plurality of solid, conically shaped, drive pins or piercing elements 14 which extend upwardly from the base plate 12. Each of the drive pins or piercing elements 14 has an elongated shaft portion 16 and terminates at its free end in pointed piercing tip 18. The conical shape helps penetrate the skin of the article to be carved, but allows a larger diameter bore proximate the base plate 12 to facilitate insertion of the saw element as shown in FIG. 4.

As can be seen in FIG. 1, the base plate 12 is generally of a rectangular shape and contains all of the elements necessary to design and carve a Jack-O-Lantern face in the skin of a pumpkin. The device 10 as shown in FIG. 1 has all four elements in a Jack-O-Lantern face i.e. two eyes, a nose and a mouth. Although it is preferred that all the elements of the design reside on a single base plate, it will be realized that such a configuration is not necessary for the practice of the invention. Thus, one or more design elements may reside on different base plates. In this manner a base plate having a single design element may be used a number of times on the same fruit or vegetable to create repetitive designs.

Figure 3:
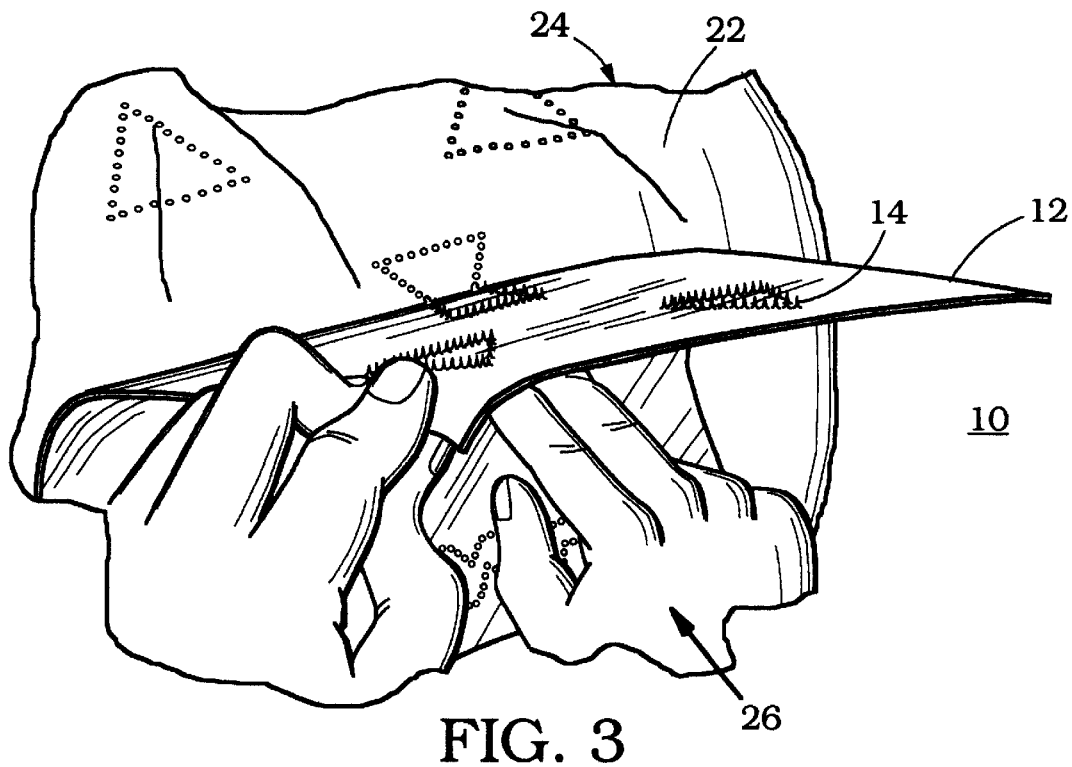
FIG. 3 is an illustrative view of the device of FIG. 1 as applied to the skin of a pumpkin and removed.

As shown in FIG. 3, the device 10 of FIG. 1 is applied to the skin 22 of the pumpkin 24 by applying manual pressure, with for example, the fingers, in the direction of arrow 26 against the base plate 12 to urge drive pins or piercing element 14 into the skin 22 of pumpkin 24, thereby penetrating the skin 22 and embedding the drive pins or piercing element 14 into the skin 22 to form a perforated design. As shown in FIG. 3, as the base plate, 12 is manipulated up the skin 22 of pumpkin 24, the drive pins or piercing elements 14 penetrate the skin 22 in accordance with the design such that when the base plate 12 is removed the drive pins or piercing elements 14 are withdrawn and, the skin 22 of pumpkin 24 is penetrated in the design carried by the drive pins or piercing elements 14 on base plate 12 of device 10. It will be realized by those skilled in the art, that by varying the array of placement of the drive pins or piercing elements 14 along the base plate 12, one can accomplish a number of designs both traditional and very artistic. For example, birds or fish and other more modern designs can be easily effected on the skin or shell of a fruit or vegetable by use of the device 10 in accordance with the method of the invention.

The material which the base plate 12 is constructed can be any material such as a clear plastic to afford visibility, but preferably is flexible, so that it can adhere and conform to the shape of the fruit or vegetable being decorated. Thus, rubberized mats, clear plastic, flexible material and the like can be used and employed in accordance with the instant invention. The shape of the drive pins or piercing elements 14 is not critical, but they must be of sufficient length and stiffness to penetrate the skin or shell of the fruit or vegetable to be decorated. Thus, the conical shape of drive pins or piercing elements 14 provides a great deal of pressure at piercing tip 18, but good stability along the body of the elongated shaft portion 16. In addition, as mentioned above the conical shape provides a larger bore hole at the surface of the fruit or vegetable so that insertion of a cutting instrument is facilitated. Thus, the driving pin or piercing elements 14 can be for example, hard plastic or metal. The length of driving pin or piercing element 14 should be sufficient to penetrate substantially the total skin or rind of the fruit or vegetable to be carved to facilitate insertion of a carving instrument to connect the hole penetration as shown in FIG. 5.

Turning to FIG. 4, pumpkin 24 having had the device 10 applied to the skin 22 as set forth in FIG. 3 is then ready to be carved. A carving instrument 30 having a handle 32 and a blade 34 with serrated edges 36 is used to insert into the perforations and follow the succession of penetrations in the skin 22 of pumpkin 24, left by the removal of device 10. As shown at 38, once the carving instrument 30 has been inserted and the flesh or meat of the fruit or vegetable cut away, an intricate pattern or design can be achieved in the fruit or vegetable. It will be realized that insertion of the cutting instrument need not run the blade 34 completely through the flesh of the fruit or vegetable to be decorated. In this manner very intricate control can be maintained over the sculpturing to yield highly decorative artifacts which add to the presentation of cuisine.

The carving instrument 30, used to cut away the flesh of the fruit or vegetable, can be for example, a serrated edge, blade or saw, a straight blade such as a scalpel or the like and even spoons or scoops used in, for example sculpturing. The material from which these devices are made can be hard plastic, metal or the like.

Figure 5:
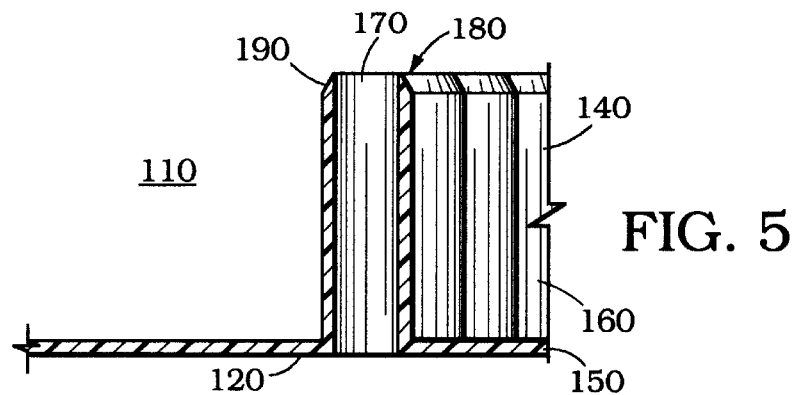
FIG. 5 shows a sectional view of the device having cylindrically shaped, hollow drive pins containing a beveled penetrating end.

In accordance with another embodiment, as illustrated in FIG. 5, the device 110 has a base plate 120 which supports a plurality of hollow piercing elements or drive pins 140 which extend upwardly at 150 from the base plate 120. Each of the hollow piercing elements or drive pins 140, is cylindrical in shape, having a hollow core 170, through an elongated shaft portion 160, and terminating at its free end in a beveled, piercing tip 180. The beveling edge 190 slops inward toward the hollow core 170 to effect a coring configuration to facilitate penetration. The hollow drive pin 140 is useful for penetrating thick rind or for penetration into, for example, the meat of a melon. This embodiment is particularly desirable when large melons such as watermelon require designs that go deep into the meat of the fruit. In this manner, the drive pins actually core a small piece of rind and meat in a tubular fashion as they are driven through the skin or rind into the meat of the fruit. The device is then cleaned by water or air pressure.

In accordance with another aspect of the invention there is provided a kit (not shown) comprising the device 10 as shown in FIG. 1 and one or more carving instruments 30 as shown in FIG. 5 along with an instruction book (not shown) on the use of the device. The decorative carving kit in accordance with the instant invention provides all the necessary elements and correlated instructions for the intricate and decorative carving of fruits and/or vegetables, and in one aspect a pumpkin, especially for Halloween. As such, the kit according to the present invention includes the tools and patterns necessary for a person to carve through the fleshy shell of a fruit and/or vegetable so as to remove portions corresponding to the decorative design whereby for example, a pumpkin may be internally lit to provide a desired glowing pattern.

A decorative carving kit (not shown) includes an instruction book in, for example a clear plastic bag showing a decoratively carved fruit or vegetable having an intricately carved design. Thus, the kit would present a pleasing appearance for point of purchase display and sale. It may be appreciated that the kit of the instant invention can be assembled in any manner, such as by placing the carving tool 30 with the instruction book (not shown) in a clear plastic, sealable envelope with one or more pattern bearing devices 10 faced such that the driving pins face each other to prevent puncturing the bag. The bag is closed or sealed to prevent the carving tool 30 and the pattern bearing device 10 from falling out of the bag.

Accordingly, the present invention has been described with some degree of particularity directed to the preferred embodiment of the present invention. It should be appreciated, though that the present invention is defined by the following claims construed in light of the prior art so that modifications or changes may be made to the preferred embodiment of the present invention without departing from the inventive concepts contained herein.

What is claimed is:

1. A fruit and vegetable decorating device for piercing the skin of a fruit or vegetable on a decorative pattern comprising:

a base plate wherein said base plate is resilient and capable of flexibly conforming to and adhering to the shape of said fruit or vegetable; and a plurality of coplanar, upstanding, hollow drive pin means for piercing the skin of a fruit or vegetable wherein said hollow drive pin means for piercing the skin of a fruit or vegetable are arranged in said decorative pattern relative to said base plate, whose axis are formed in a plane substantially perpendicular to the plane of the base plate and having one end attached to the base plate and the other which forms a piercing tip.

2. The device of claim 1 wherein said hollow drive pin means for piercing the skin of a fruit or vegetable are cylindrical in shape and said piercing tip having edges is formed by beveling the edges of said hollow drive pin means for piercing the skin of a fruit or vegetable said edges sloping inward toward the hollow core of said hollow drive pin means.

\* \* \* \* \*